United States Patent [19]

Gaydecki

[11] 4,310,579

[45] Jan. 12, 1982

[54] ELASTOMERIC ELEMENTS

[75] Inventor: Jan Gaydecki, Leicester, England

[73] Assignee: Dunlop Limited, London, England

[21] Appl. No.: 110,358

[22] Filed: Jan. 8, 1980

[30] Foreign Application Priority Data

Jan. 13, 1979 [GB] United Kingdom ............... 01336/79
Jan. 13, 1979 [GB] United Kingdom ............... 01489/79

[51] Int. Cl.³ .............................................. B32B 5/12
[52] U.S. Cl. .................................... 428/105; 428/107;
428/110; 428/111; 428/121; 428/181; 428/246;
428/252; 428/295
[58] Field of Search ............... 428/105, 107, 108, 109,
428/110, 111, 112, 181, 121, 246, 252, 295, 492,
130

[56] References Cited

U.S. PATENT DOCUMENTS

| | | | |
|---|---|---|---|
| 3,466,219 | 9/1969 | Schwartz | 428/105 |
| 3,568,286 | 3/1971 | Ross | 428/105 |
| 3,819,469 | 6/1974 | Balch et al. | 428/107 |
| 4,201,815 | 5/1980 | Weiland et al. | 428/105 |
| 4,209,089 | 6/1980 | Day | 428/247 |

*Primary Examiner*—James J. Bell
*Attorney, Agent, or Firm*—Stevens, Davis, Miller & Mosher

[57] ABSTRACT

An elastomeric element, suitable for use in a flexible coupling for transmitting torque between two relatively rotatable components, comprises an elastomeric element having an embedded reinforcement of a plurality of parallel interleaving fabric layers spaced apart by a layer of elastomeric material, each fabric layer comprising a plurality of elongate reinforcement members extending parallel to one another and the reinforcement members of successive fabric layers being angled relative to one another.

19 Claims, 11 Drawing Figures

ELASTOMERIC ELEMENTS

This invention concerns improvements in or relating to elastomeric elements and in particular though not exclusively to elements for flexible couplings of the type used to transmit torque between two relatively rotatable components, for example driving and driven shafts.

Flexible couplings for transmitting torque between two relatively rotatable components are known comprising a plurality of elastomeric elements arranged to form an annular ring in which adjacent elements are separated by and bonded to rigid connecting members. The connecting members are adapted to be alternately connected to a respective one of the components.

For a given size of coupling the torque capacity is dependent on the compression stiffness of the elements. The elements are usually made of rubber and it is known that the compression stiffness of an element can be increased by a reinforcement comprising one or more metal plates giving a sandwich construction in which adjacent rubber layers are separated by and bonded to a metal plate. The or each metal plate extends generally parallel with the end faces of the element i.e. in a generally radial direction relative to the axis of rotation of the coupling.

A disadvantage of this type of reinforcement is that the metal plates restrict the speed of the coupling due to increased centrifugal forces and shear stresses on the bonded surfaces. The number of metal plates which can be incorporated in a given element is therefore restricted and consequently the amount by which the compression stiffness of the element can be increased is restricted.

A further disadvantage of this reinforcement is that an increase in the number of metal plates reduces the volume of rubber in the element, causing an increase in the bending strains of the coupling and resulting in conical deflection of the coupling being severely restricted.

According to one aspect of the present invention we provide an elastomeric element having an embedded reinforcement comprising a plurality of parallel interleaving fabric layers spaced apart by a layer of elastomeric material, each fabric layer comprising a plurality of elongate reinforcement members extending parallel to one another in which the reinforcement members of successive fabric layers are angled relative to one another.

Each reinforcement member may be in the form of filaments, strands or cords and may be formed from a natural or synthetic textile material or a non-textile material, for example a polyester, terylene (registered Trade Mark), rayon, nylon, aromatic polyamide, glass fibre or metal such as steel. Preferably the reinforcement members comprise nylon cords.

The fabric layers may comprise separate fabric strips. Alternatively the fabric layers may be formed by folding two elongate fabric strips over each other so that alternate layers are formed by one continuous strip. More preferably however the fabric layers are formed by folding a single elongate fabric strip.

Preferably the or each strip is/are embedded in a matrix of elastomeric material, for example a natural or synthetic rubber matrix. Preferably the thickness of elastomeric material between successive fabric layers is of the order of 1 to 2 mm. Preferably the reinforcement members of successive fabric layers extend at an angle in the range from 30° to 90° relative to one another but more preferably extend normal to one another.

According to a further aspect of the present invention we provide a flexible coupling for transmitting torque between two relatively rotatable components, the coupling including first and second means for connection to a respective one of said components and at least one elastomeric element according to the first aspect of the present invention acting between said first and second means.

Preferably said first and second means comprise a plurality of rigid connecting members arranged to form a ring with alternate members being adapted for connection to a respective one of said components and a respective elastomeric element acting between successive members.

The elements are arranged so that the fabric layers of the reinforcement extend in a generally radial direction relative to the axis of rotation of the coupling i.e. the fabric layers lie in planes normal to the direction in which compression forces are applied to the elements in use of the coupling.

The compression stiffness of a coupling according to the second aspect of the present invention is therefore increased as compared with a similar coupling in which the elements have no embedded reinforcement whilst the aforementioned problems and disadvantages associated with couplings in which the elements have a large number of metal plates as the reinforcement are substantially avoided. Thus for a given size of coupling it has been found that a given increase in compression stiffness can be obtained together with a smaller reduction in conical flexibility using the fabric reinforced elements according to the present invention as compared with elements reinforced by metal plates.

The invention will now be described in more detail, by way of example only, with reference to the accompanying drawings wherein.

Figure 1:
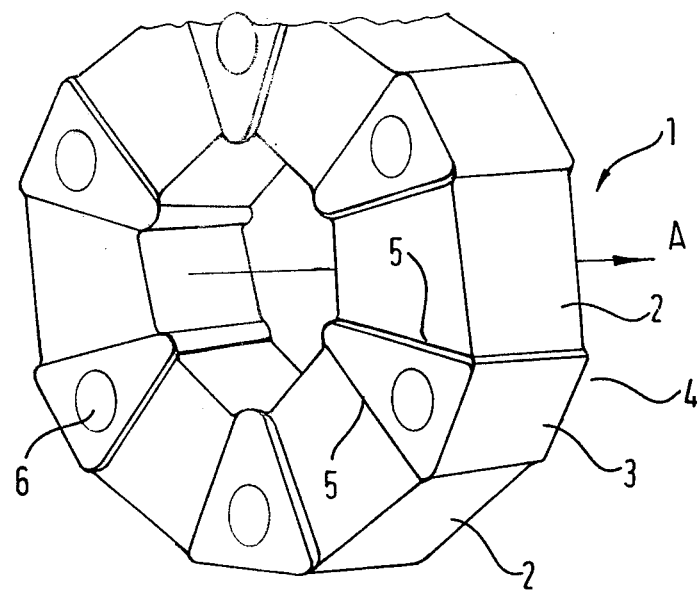
FIG. 1 is a perspective view of a flexible coupling incorporating elastomeric elements according to the present invention.

The flexible coupling 1 shown in FIG. 1 of the accompanying drawings is used for transmitting torque between two relatively rotatable components (not shown) for example driving and driven shafts and comprises six similar elastomeric elements 2 and six rigid, wedge-shaped connecting elements 3.

The elements 2,3 are arranged to form an annular ring 4 in which confronting end faces 5 of adjacent elements 2 are separated by and bonded to an associated connecting element 3. A metal restraining band (not shown) extends around the periphery of the coupling 1 to restrain the elements 2,3 in the assembled condition in which the elements 2 are precompressed to facilitate attachment of the coupling to the rotatable members. The band is subsequently removed prior to use of the coupling to transmit torque.

Each connecting element 3 has an axially directed through bore 6 adapted to receive a complementary rod (not shown) associated with one of the rotatable components. In use the connecting elements are alternately connected to a respective one of the rotatable components.

Figure 2:
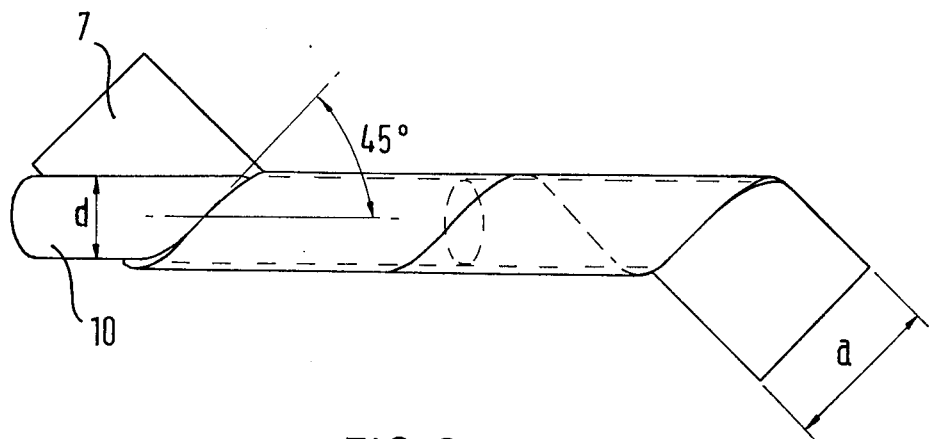
FIGS. 2, 3 and 4 show the formation of one of the elastomeric elements of the coupling shown in FIG. 1 formed from a single fabric strip.
Figure 3:
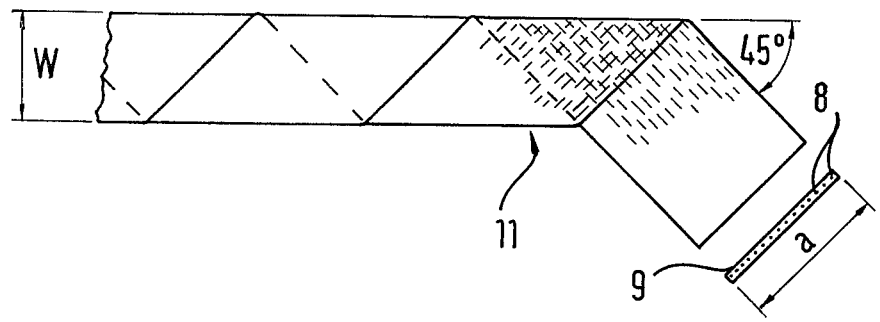

As thus aforedescribed the coupling is of a conventional type. In accordance with the present invention each element 2 is of a novel construction formed by folding a single fabric strip 7 in the manner shown in FIGS. 2 to 4 to which the following description relates.

The strip 7 comprises a plurality of parallel nylon cords 8 extending longitudinally of the strip and evenly spaced across the width a of the strip. The cords are embedded in a rubber matrix 9 of overall thickness 2.8 mm by calendering rubber on both sides of the strip. The strip 7 is wound onto a cylindrical mandrel 10 having a diameter d at an angle of 45° to the longitudinal axis of the mandrel. The mandrel 10 is then removed and the wound strip flattened to form a strip 11 of double thickness (FIG. 3) having a width $W=a/\sqrt{2}$ in which the cords on one side of the strip extend at 90° to the cords on the other side.

Figure 4:
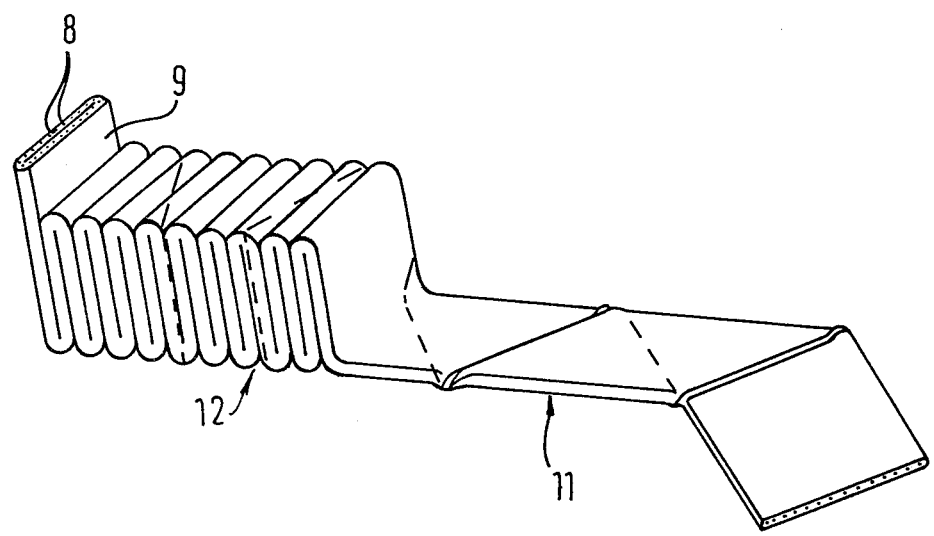

The strip 11 is then folded in concertina fashion as shown in FIG. 4 to form a rectangular block 12 from which the element 2 is cut, the lines of the cuts being shown in broken lines. The elastomeric element 2 thus formed has an embedded reinforcement comprising a plurality of interleaving fabric layers in which each fabric layer comprises a plurality of parallel cords with the cords of successive fabric layers extending normal to one another.

In the assembled coupling 1 shown in FIG. 1 the fabric layers extend in a generally radial direction relative to the axis of rotation of the coupling indicated by the arrow A, i e the layers extend in a direction transverse to that in which compression forces are applied in use of the coupling. It has been found that the torque capacity of the above-described coupling is between 4.5 to 5.0 times the torque capacity of a similar coupling in which the elements have no reinforcement while the conical stiffness is increased by a factor of 1.20.

Figure 5:
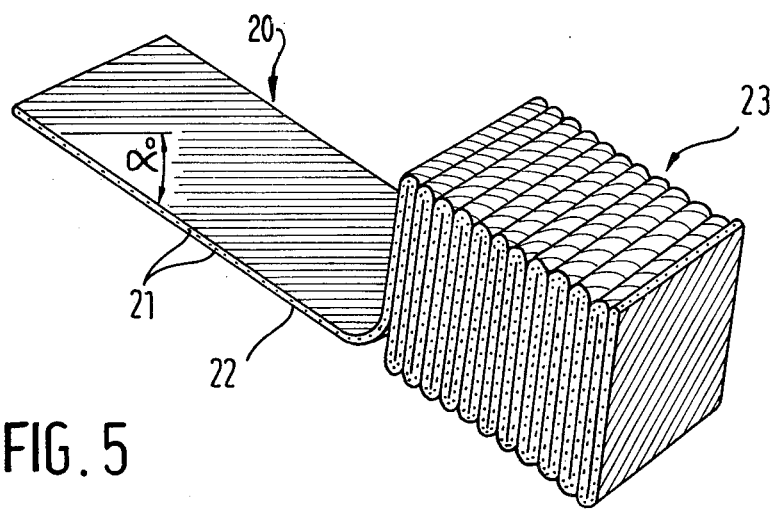
FIGS. 5 and 6 show alternative methods of forming an elastomeric element according to the present invention from a single strip.
Figure 6:
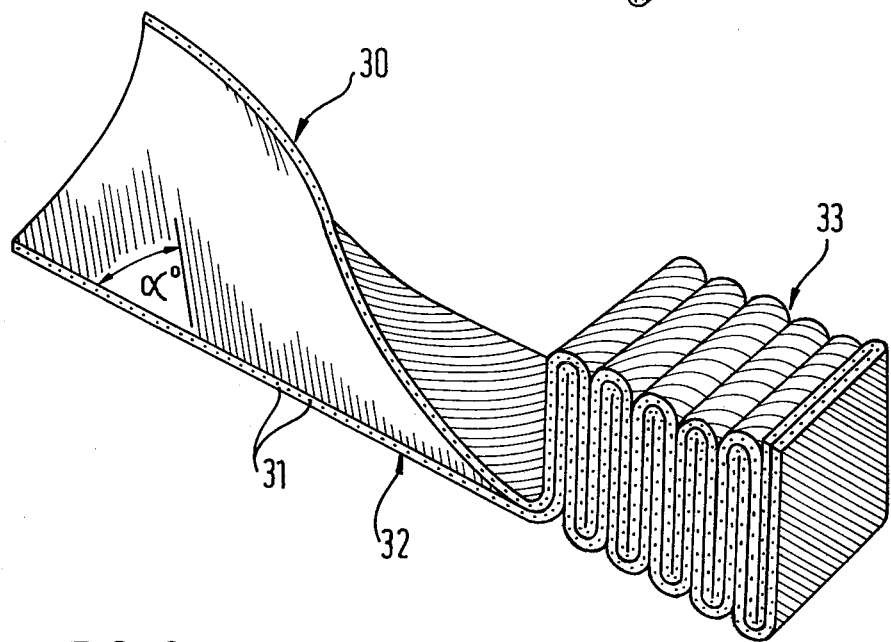

FIGS. 5 and 6 show alternative methods of forming an elastomeric element from a single strip. In FIG. 5 the strip 20 comprises a plurality of parallel nylon cords 21 cut at a bias angle α of 45° and embedded in a rubber matrix 22 of overall thickness 1.5 to 4.0 mm. The strip 20 is folded concertina fashion to form a block 23 in which the cords in successive layers extend normal to one another. In FIG. 6 the strip 30 also comprises a plurality of parallel nylon cords 31 cut at a bias angle α of 45° and embedded in a rubber matric 32 of overall thickness 3.0 to 6.0 mm. The width of the strip 30 is double that of the strip 20. The strip 30 is first folded over to form a double layer strip in which the cords in each layer extend normal to one another and the double layer strip is then folded concertina fashion to form a block 33 in which the cords in successive layers extend normal to one another. The elastomeric element is cut from the blocks 23,33 as described above with reference to FIG. 4.

Elements formed from the block 23 have folded edges constraining the rubber on two sides and those formed from the block 33 have folded edges on three sides while those formed from the block 12 have folded edges on four sides. As a result the torsional stiffness of a coupling incorporating elements cut from the blocks 12,23,33 will vary being greatest for elements cut from block 12 and least for elements cut from block 23.

Figure 7:
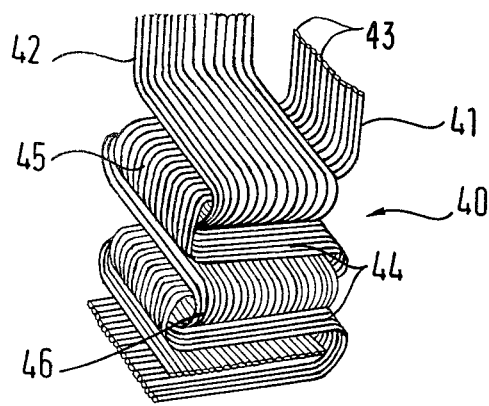
FIG. 7 is a perspective view of an alternative reinforcement construction for an elastomeric element according to the present invention formed from two interfolded fabric strips.

Referring now to FIG. 7 there is shown an alternative construction of reinforcement 40 for the elements 2 of the coupling 1 shown in FIG. 1.

The reinforcement 40 comprises two fabric strips 41,42 of textile material. Each strip comprises a plurality of longitudinally extending nylon cords 43 embedded in a rubber matrix of overall thickness 1.5 to 3.0 mm by calendering rubber to both sides of the strip. The strips 41,42 are folded over each other to form a plurality of generally parallel interleaving layers 44 in which alternate layers are formed by one continuous strip. The cords of successive layers 44 extend normal to one another.

The reinforcement 40 is assembled and subsequently embedded in the elastomeric material of the associated element 2 during moulding of the coupling. The rubber extends between and is bonded to successive layers 44 which are spaced 3.0 to 6.0 mm apart and is confined therebetween by the folded edge portions 45,46 which connect alternate layers formed by the strips 41,42 respectively.

In the assembled coupling each layer 44 extends in a generally radial direction relative to the axis of rotation of the coupling.

The torque capacity of the coupling 1 in which each element has an embedded reinforcement 40 is between 4 to 4.5 times the torque capacity of a similar coupling in which the elements have no reinforcement while the conical stiffness is increased by a factor of 1.25.

Figure 8:
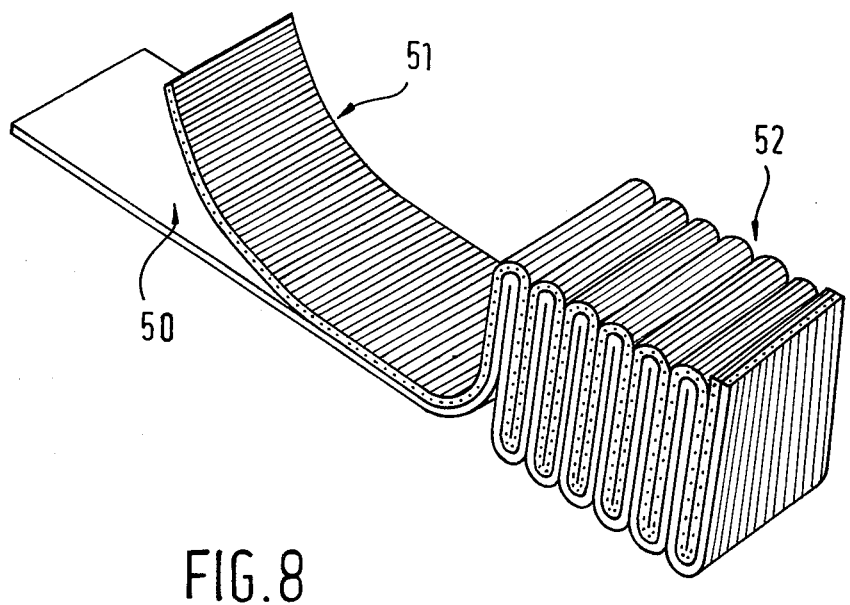
FIG. 8 shows an alternative method of forming an elastomeric element according to the present invention from two strips.

FIG. 8 shows an alternative method of forming an elastomeric element from two strips 50,51. Each strip comprises a plurality of parallel nylon cords embedded in a rubber matrix of overall thickness 1.5 to 3.0 mm. The cords extend longitudinally of the strip 50 and transversely of the strip 51. The strips are first laid on top of one another so that the cords of one strip extend normal to the cords of the other strip and the double layer strips is then folded concertina fashion to form a block 52 in which the cords in successive layers extend normal to one another. The elastomeric element is cut from the block 52 as described previously.

Figure 9:
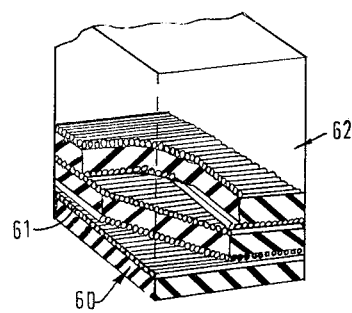
FIGS. 9, 10 and 11 show alternative methods of forming an elastomeric element according to the present invention from a plurality of separate strips.
Figure 10:
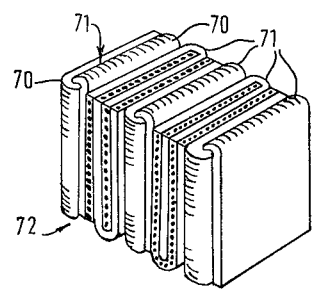
Figure 11:
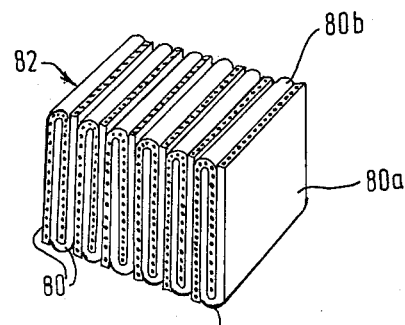

Referring now to FIGS. 9, 10 and 11 there are shown alternative methods of forming an elastomeric element from a plurality of separate strips.

In FIG. 9 each strip 60 comprises a plurality of parallel longitudinally extending nylon cords 61 embedded in a rubber matrix of overall thickness 0.8 mm. The strips 60 are arranged in pairs to form double layers in which the cords of one layer extend normal to the cords of the other layer. The double layers are embedded in a rubber matrix uniformly spaced 3.6 mm apart to form a rectangular block 62 in which the cords of successive layers extend normal to one another.

In FIG. 10 each strip 70 comprises a plurality of parallel longitudinally extending nylon cords embedded in a rubber matrix. The strips 70 are folded in pairs to form units 71 in which the cords of successive layers extend normal to one another. Several units 71 are then arranged to form a rectangular block 72.

In FIG. 11 each strip 80 comprises a plurality of parallel nylon cords embedded in a rubber matrix. The strips are arranged in pairs in which one 80a has longitudinally extending cords and the other 80b transversely extending cords. Each pair is folded to form a unit 81 in which the cords of successive layers extend normal to one another. Several units are then combined to form a rectangular block 82. The elastomeric element is cut from the blocks 62,72,82 as described previously.

The invention is not restricted to the above-described embodiments, for example the elastomeric elements of the present invention may be made from any suitable resilient elastomeric material for example natural or synthetic rubbers or resilient plastics material.

Similarly the fabric reinforcement may be made of any suitable material compatible with the elastomeric material of the elements for example natural or synthetic textile materials or non-textile materials such as glass fiber or steel. Nylon is preferred as the material for the reinforcement when the elements are made of rubber because it can stretch up to 12%, bonds well to rubber and absorbs a significant amount of strain energy.

It will be appreciated that in place of cords the reinforcement may comprise a plurality of parallel strands or filaments.

Each fabric strip may be non-woven as described in the foregoing embodiments or woven. Thus each strip may have longitudinally and transversely extending reinforcement members.

The elements can be of any appropriate shape in which the reinforcement layers extend generally parallel to one another and in a generally radial direction in the assembled coupling.

The angle at which the cords of successive layers extend relative to one another may be varied by cutting the strips to give any desired bias angle α for the cords.

The number of fabric layers may be varied to provide the required compression stiffness characteristics for the element.

Finally the fabric reinforced element according to the invention has uses other than in flexible couplings e.g. the element could be used as an engine mounting and for applications where high load capacity is required such as for structural mountings.

Having now described my invention what I claim is:

1. An elastomeric element having opposing end faces connected to connecting elements which transmit a compression load on said faces, said elastomeric element further including an embedded reinforcement comprising a plurality of parallel interleaving fabric layers spaced apart by a layer of elastomeric material, wherein each fabric layer includes a plurality of elongate reinforcement members extending parallel to one another in which the reinforcement members of successive fabric layers are angled relative to one another, and each fabric layer extends substantially normal to the direction of compression loading of said elastomeric element by said connecting elements.

2. An elastomeric element according to claim 1 wherein said fabric layers are formed by separate fabric strips.

3. An elastomeric element according to claim 2 wherein said fabric strips are arranged in pairs with the reinforcement members of one layer being angled relative to the reinforcement members of said other layer.

4. An elastomeric element according to claim 1 wherein said fabric layers are formed of two elongate fabric strips folded so that alternate layers are formed by a respective one of said strips.

5. An elastomeric element according to claim 1 wherein said fabric layers are formed by one elongate fabric strip.

6. An elastomeric element according to claim 2 wherein said strips are embedded in a matrix of elastomeric material.

7. An elastomeric element according to claim 1 wherein reinforcement members of successive layers extend normal to one another.

8. An elastomeric element according to claim 1 wherein each reinforcement member is selected from a group comprising filaments, strands and cords.

9. An elastomeric element according to claim 1 wherein each reinforcement member is formed from a textile material.

10. An elastomeric element according to claim 1 wherein each reinforcement member is formed from a non-textile material.

11. An elastomeric element according to claim 1 wherein each fabric layer is non-woven.

12. An elastomeric element having opposing end faces connected to connecting elements which transmit a compression load on said faces, said elastomeric element including an embedded reinforcement comprising a plurality of parallel interleaving fabric layers which are normal to the direction of compression loading, wherein each of said fabric layers is formed from an elongate fabric strip having a plurality of elongate reinforcement members extending parallel to one another which are embedded in a matrix of elastomeric material, wherein said fabric strip is helically wound and flattened to form a reinforcement strip having a top and bottom layer in which the elongate reinforcement members in the top layer are substantially normal to the elongate reinforcement members of the bottom layer, and wherein said reinforcement strip is folded in a concertina configuration.

13. An elastomeric element having opposing end faces connected to connecting elements which transmit a compression load on said faces, said elastomeric element including an embedded reinforcement comprising a plurality of parallel, interleaving fabric layers which are substantially normal to the direction of the compression load, wherein said fabric layers are formed from a pair of elongate fabric strips folded over each other, and wherein each fabric strip includes a plurality of elongate reinforcement members which extend parallel to one another and which are embedded in a matrix of elastomeric material.

14. A flexible coupling for transmitting torque between two relatively rotatable components comprising a plurality of elastomeric elements, a plurality of connecting elements disposed between each of said elastomeric elements, and means for connecting said connecting elements to one of said rotatable components, wherein each elastomeric element has an embedded reinforcement comprising a plurality of parallel, interleaving fabric layers spaced apart by a layer of elastomeric material, wherein each fabric layer includes a plurality of elongate reinforcement members extending parallel to one another in which the reinforcement members of successive fabric layers are angled relative to one another.

15. A flexible coupling for transmitting torque between a drive shaft and a driven shaft, including a plurality of elastomeric elements and a plurality of connecting elements, wherein each of said elastomeric elements is disposed between a pair of said connecting elements, and wherein one of each pair of said connecting elements applies a compressive load on a face of the respective elastomeric element disposed therebetween, and wherein each of said elastomeric elements includes an embedded reinforcement comprising a plurality of parallel interleaving fabric layers spaced apart by a layer of elastomeric material, each fabric layer including a plurality of elongate reinforcement members extending parallel to one another in which the reinforcement members of successive fabric layers are angled relative to one another, and each fabric layer extending substantially normal to the direction of said compressive load applied onto said face of said elastomeric element by said connecting element.

16. The flexible coupling defined in claim 15, wherein said plurality of interleaving fabric layers is comprised of concertina folds of a double layer strip formed from a plurality of successive, substantially 45° angle folds on a single elongate fabric strip, wherein said fabric strip includes a plurality of elongate, parallel reinforcement members embedded in a matrix of elastomeric material, and wherein said concertina folds function to increase the compressional stiffness of said elastomeric element by defining the elastomeric material forming said fabric strip.

17. The flexible coupling defined in claim 15, wherein said plurality of interleaving fabric layers is comprised of a plurality of folds of two interleaving elongate fabric strips, each of which includes a plurality of elongate, parallel reinforcement members embedded in a matrix of elastomeric material, and wherein said folds function to increase the compressional stiffness of said element by confining the elastomeric material forming said fabric strip.

18. The flexible coupling defined in claim 16, wherein said single elongate fabric strip is substantially rectangular in shape, and wherein said concertina folds function to increase the compressional stiffness of said elastomeric element by confining the elastomeric material forming said fabric strip on all four sides of said fabric strip.

19. The flexible coupling defined in claim 17, wherein each of said two elongate fabric strips is substantially rectangular in shape, and wherein said folds function to increase the compressional stiffness of said elastomeric element by confining the elastomeric material forming said fabric strip on three sides of said fabric strip.

* * * * *